United States Patent [19]

Hashiue

[11] Patent Number: 4,882,488

[45] Date of Patent: Nov. 21, 1989

[54] RADIATION IMAGE READ-OUT AND REPRODUCING METHOD

[75] Inventor: Masakazu Hashiue, Tokyo, Japan

[73] Assignee: Fuji Photo Film Co., Kanagawa, Japan

[21] Appl. No.: 251,481

[22] Filed: Sep. 30, 1988

[30] Foreign Application Priority Data

Sep. 30, 1987 [JP] Japan .................... 62-247316
Sep. 30, 1987 [JP] Japan .................... 62-247317
Oct. 19, 1987 [JP] Japan .................... 62-263226
Oct. 19, 1987 [JP] Japan .................... 62-263227

[51] Int. Cl.$^4$ .............................. G01T 1/20
[52] U.S. Cl. ................... 250/327.2; 250/337
[58] Field of Search .......... 250/327.2 G, 327.2 B, 250/327.2 D, 484.1 B, 337

[56] References Cited

U.S. PATENT DOCUMENTS 4,302,671 11/1981 Kato et al. ................... 250/337
4,310,886 1/1982 Kato et al. ................ 250/327.2 G
4,387,428 1/1983 Ishida et al. .................. 250/337

Primary Examiner—Janice A. Howell
Assistant Examiner—Richard Hanig
Attorney, Agent, or Firm—Sughrue, Mion, Zinn, Macpeak & Seas

[57] ABSTRACT

A stimulable phosphor sheet carrying a radiation image stored thereon is mounted on a first rotary plate, and a stimulating light beam is projected onto the sheet while the first rotary plate is rotated, thereby effecting main scanning of the sheet by the stimulating light beam. The stimulating light beam is moved relative to the first rotary plate in a radial direction of the first rotary plate to effect sub-scanning of the sheet by the stimulating light beam. Light emitted by the sheet upon stimulation by the stimulating light beam is photoelectrically detected by a photoelectric converter, thereby obtaining an image signal. Recording light beam is modulated on the basis of the image signal, and the modulated recording light beam is projected onto a recording medium mounted on a second rotary plate while the second rotary plate is rotated in synchronization with the main scanning of the recording medium by the stimulating light beam to effect main scanning of the recording medium by the recording light beam. The recording light beam is moved relative to the second rotary plate in a radial direction of the second rotary plate in synchronization with the sub-scanning of the sheet by the stimulating light beam to effect sub-scanning of the recording medium by the recording light beam.

32 Claims, 3 Drawing Sheets

RADIATION IMAGE READ-OUT AND REPRODUCING METHOD

BACKGROUND OF THE INVENTION

1. Field of the Invention

This invention relates to a radiation image read-out and reproducing method for reading out an image stored on a stimulable phosphor sheet by exposing the stimulable phosphor sheet to stimulating rays which cause the stimulable phosphor sheet to emit light in proportion to the stored radiation energy and photoelectrically detecting the emitted light, and more particularly to such a method suitable for a relatively small stimulable phosphor sheet used for testing a small industrial article, X-ray test of a limited part and the like.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then when the phosphor which has been exposed to the radiation is exposed to stimulating rays such as visible light, light emitted by the phosphor in proportion to the stored energy of the radiation. A phosphor exhibiting such properties is referred to as a stimulable phosphor.

A sheet provided with a layer of the stimulable phosphor is referred to as a stimulable phosphor sheet and is useful for reading out image information for various purposes.

For example, as disclosed in Japanese Unexamined Patent Publication Nos. 55(1980)-12429, and 56(1981)-11395, it has been proposed to use the stimulable phosphor sheet in a radiation image recording and reproducing system. That is, the stimulable phosphor sheet is first exposed to a radiation passing through an object such as human body to have a radiation image of the object stored thereon, and is then exposed to stimulating rays which cause the stimulable phosphor sheet to emit light in proportion to the stored radiation energy. The light emitted by the stimulable phosphor sheet upon stimulation thereof is photoelectrically detected and converted to an electric image signal by a photodetector, and the radiation image of the object is reproduced as a visible image by use of the image signal on a recording medium such as a photographic film, a display device such as a cathode ray tube (CRT), or the like.

However, in the conventional systems, the stimulating rays are caused to raster-scan the stimulable phosphor sheet in order to read out image information over a wide range on the sheet, and accordingly, complicated main scanning and sub scanning are required for stimulation of the sheet and for detection of the light emitted by the sheet upon stimulation thereof, whereby the overall system is complicated and becomes large in size.

The light emitted by the sheet and carrying image information is photoelectrically detected by a photodetector and delivered to the visible image reproducing section after converted to an electric signal. When the radiation image is reproduced as a visible image on a recording medium such as a photographic film by, for instance, a recording light beam modulated on the basis of the electric signal, complicated main scanning and sub scanning are required as in the case of stimulation of the sheet. This further makes the system large in size and complicated.

On the other hand, since the aforesaid system is very effective for medical diagnosis, there have been demands towards miniaturization and simplification of the system and reduction of the manufacturing cost of the system. If such demands can be met, not only large hospitals but also consultation rooms of medical practitioners can be equipped with the system.

In the case that the system is for handling a limited part of the human body or the like, the stimulable phosphor sheet need not be large in size, and a small stimulable phosphor sheet suffices for such purposes. Accordingly, a miniaturized and simplified system for small size stimulable phosphor sheets will be convenient.

Further, in the case where the stimulable phosphor sheet is used for non-destructive inspection of small industrial articles, autoradiography of hybrid formation of DNA colonies or of electrophoresis pattern of protein, or the like, the effective area of the sheet may be substantially small. In such cases, it will be preferred that the image read-out and reproducing system conforms to the small stimulable phosphor sheet in scale. Further along with miniaturization of the system, there is an increasing demand for simplification of operation and adjustment of the system and for reduction of the manufacturing cost.

SUMMARY OF THE INVENTION

In view of the foregoing observations and description, the primary object of the present invention is to provide a radiation image read-out and reproducing method for reproducing a radiation image stored on a stimulable phosphor sheet as a visible image by exposing the stimulable phosphor sheet to stimulating rays which cause the stimulable phosphor sheet to emit light in proportion to the stored radiation energy, photoelectrically detecting the light emitted by the stimulable phosphor sheet upon stimulation thereof, and reproducing the radiation image as a visible image on a recording medium by use of an image signal obtained through the detection, which method enables miniaturization of the system, simplification of operation and adjustment of the system, and reduction of the manufacturing cost of the system.

Another object of the present invention is to provide a radiation image read-out and reproducing method for reproducing a radiation image stored on a stimulable phosphor sheet as a visible image by exposing the stimulable phosphor sheet to stimulating rays which cause the stimulable phosphor sheet to emit light in proportion to the stored radiation energy, photoelectrically detecting the light emitted by the stimulable phosphor sheet upon stimulation thereof, and reproducing the radiation image as a visible image on a recording medium by use of an image signal obtained through the detection, which method enables miniaturization of the system, simplification of operation and adjustment of the system, and reduction of the manufacturing cost of the system without deteriorating the read-out accuracy of the image information or the recording accuracy of the image information when forming a visible image on the basis of the image information.

In accordance with a first aspect of the present invention, there is provided a radiation image read-out and reproducing method which is a combination of a radiation image read-out method for reading out a radiation image stored on a stimulable phosphor sheet and a radiation image reproducing method for reproducing the radiation image as a visible image. The read-out method is characterized in that a stimulable phosphor sheet carrying a radiation image stored thereon is mounted on a first rotary plate, stimulating rays are projected onto the sheet in the form of a stimulating light beam while the first rotary plate is rotated to effect main scanning of the sheet by the stimulating light beam, the stimulating light beam is moved relative to the first rotary plate in a radial direction of the first rotary plate to effect sub-scanning of the sheet by the stimulating light beam, and light emitted by the stimulable phosphor sheet upon stimulation by the stimulating light beam is photoelectrically detected by a photoelectric converter means. The radiation image reproducing method is characterized in that recording light is modulated on the basis of the image signal obtained in accordance with the read-out method, the modulated recording light is projected onto a recording medium mounted on a second rotary plate in the form of a recording light beam while the second rotary plate is rotated in synchronization with the main scanning of the recording medium by the stimulating light beam to effect main scanning of the recording medium by the recording light beam, and the recording light beam is moved relative to the second rotary plate in a radial direction of the second rotary plate in synchronization with the sub-scanning of the stimulable phosphor sheet by the stimulating light beam to effect subscanning of the recording medium by the recording light beam, whereby the radiation image is recorded on the recording medium simultaneously with read-out of the radiation image stored on the stimulable phosphor sheet.

That is, in accordance with the method, by rotating and linearly moving the first rotary plate carrying the stimulable phosphor sheet relative to the stimulating light beam, the stimulating light beam is caused to scan the stimulable phosphor sheet, thereby reading out the radiation image stored thereon, and at the same time, by rotating and linearly moving the second rotary plate carrying a recording medium relative to the recording light beam in synchronization with the first rotary plate, the recording light beam is caused to scan the recording medium, thereby recording the radiation image as a visible on the recording medium. For both the stimulating light beam and the recording light beam, the main scanning is effected by rotating the rotary plate and the sub-scanning is effected by radially moving the light beam relative to the rotary plate.

The radiation image read-out and reproducing method in accordance with a second aspect of the present invention is characterized in that read-out of the radiation image stored on the stimulable phosphor sheet and reproduction of the radiation image as a visible image are carried out by the use of first and second rotary plates provided on the same rotational shaft. The read-out method is characterized in that a stimulable phosphor sheet carrying a radiation image stored thereon is mounted on the first rotary plate, stimulating rays are projected onto the sheet in the form of a stimulating light beam while the first rotary plate is rotated to effect main scanning of the sheet by the stimulating light beam, the stimulating light beam is moved relative to the first rotary plate in a radial direction of the first rotary plate to effect sub-scanning of the sheet by the stimulating light beam, and light emitted by the stimulable phosphor sheet upon stimulation by the stimulating light beam is photoelectrically detected by a photoelectric converter means. The radiation image reproducing method is characterized in that recording light is modulated on the basis of the image signal obtained in accordance with the read-out method, the modulated recording light is projected onto a recording medium mounted on the second rotary plate in the form of a recording light beam to impinge upon the recording medium in a position having a position vector from the rotational axis of the second rotary plate equal to the position vector from the rotational axis of the first rotary plate representing the stimulating light beam projecting position in which said stimulating light beam impinges upon the stimulable phosphor sheet while the second rotary plate is rotated integrally with the first rotary plate in synchronization with the rotation of the first rotary plate for said main scanning, thereby effecting main scanning of the recording medium by the recording light beam, and the recording light beam is moved relative to the second rotary plate in a radial direction of the second rotary plate in synchronization with the movement of said stimulating light beam relative to the stimulable phosphor sheet for said sub-scanning to effect sub-scanning of the recording medium by the recording light beam, whereby the radiation image is recorded on the recording medium simultaneously with read-out of the radiation image stored on the stimulable phosphor sheet.

That is, in accordance with the method, the radiation image stored on the stimulable phosphor sheet is recorded on the recording medium as a visible image by respectively mounting the stimulable phosphor sheet and the recording medium on the first rotary plate and the second rotary plate which rotates integrally with the first rotary plate on the same rotational shaft, and by causing the stimulating light beam and the recording light beam to respectively scan the stimulable phosphor sheet and the recording medium by rotating the stimulable phosphor sheet and the recording medium integrally with each other on the same rotational shaft and linearly moving them integrally with each other relative to the stimulating light beam and the recording light beam. The stimulating light beam projecting position in which the stimulating light beam impinges upon the stimulable phosphor sheet and the recording light beam projecting position in which the recording light beam impinges upon the recording medium are set not to move relative to each other.

Said first and second rotary plates may be spaced from each other or may be in contact with each other so long as they are on the same rotational shaft. Further, the method of the present invention also includes the case where one side of a single rotary plate is used as the first and rotary plate and the other side of the rotary plate is used as the second rotary plate.

The radiation image read-out and reproducing method in accordance with a third aspect of the present invention is characterized in that a stimulable phosphor sheet carrying a radiation image stored thereon and a recording medium adapted to recording the radiation image as a visible image are mounted on a rotary plate rotatable about a rotational axis so that the recording surfaces thereof face in opposite directions, stimulating rays are projected onto the stimulable phosphor sheet in the form of a stimulating light beam while recording light is projected onto the recording medium in the form of a recording light beam to impinge upon the recording medium in a position which is equal in direction and distance from the rotational axis of the rotary plate to the stimulating light beam projecting position on the stimulable phosphor sheet in which the stimulating light beam impinges upon the stimulable phosphor sheet, main scanning of the stimulable phosphor sheet by the stimulating light beam and main scanning of the recording medium by the recording light beam are effected by rotating the rotary plate during projection of the stimulating light beam and the recording light beam, sub-scanning of the stimulable phosphor sheet by the stimulating light beam and sub-scanning of the recording medium by the recording light beam are effected by moving the stimulating light beam and the recording light beam relative to the rotary plate in a radial direction of the rotary plate, the surface wobble of the rotary plate due to the rotation thereof is measured, and the stimulating light beam and the recording light beam are controlled to correctly focus respectively on the stimulable phosphor sheet and the recording medium on the basis of the result of the measurement while the stimulable phosphor sheet and the recording medium are scanned by the respective light beams.

The stimulating light beam projecting position and the recording light beam projecting position are set not to move relative to each other.

The stimulable phosphor sheet and the recording medium may be mounted on the same side of the rotary plate or may be mounted on opposite sides of the rotary plate.

The surface wobble of the rotary plate may be measured by any measuring means irrespective of whether it is a contact type or non-contact type. However, it is preferred that an optical, electrical or magnetical measuring means be employed in order to stably accomplish the measurement without being affected by friction between a measuring probe and the rotary plate.

The stimulating light beam and the recording light beam can be controlled to correctly focus respectively on the stimulable phosphor sheet and the recording medium, for instance, by moving an optical element such as the focusing lens, or the light source along the optical axis.

In the methods in accordance with the first to third aspects of the present invention, the rotary plate need not be circular in shape but may be of a polygon substantially symmetrical about the center of rotation thereof. The term "a radial direction of the rotary plate" means the direction of the line which passes the center of rotation of the rotary plate and the light beam projecting position in which the stimulating light beam or the recording light beam impinges upon the stimulable phosphor sheet or the recording medium, and along which the stimulating light beam or the recording light beam is moved.

In accordance with the first aspect of the present invention, the stimulable phosphor sheet and the recording medium are mounted on rotary plates and the main scanning of the stimulable phosphor sheet and the recording medium is effected by rotating the rotary plates. Accordingly, optical systems such as a galvanometer mirror or a polygonal mirror which have been used for the main scanning of the stimulable phosphor sheet and the recording medium in the conventional systems can be eliminated, whereby the scanning systems can be compactly arranged, and operation and adjustment of the scanning systems are facilitated. Further, the manufacturing cost of the scanning systems can be lowered by the cost of such optical systems.

In accordance wit the second aspect of the present invention, the stimulable phosphor sheet and the recording medium are mounted on rotary plates which are arranged to be rotated integrally with each other and the main scanning of the stimulable phosphor sheet and the recording medium is effected by rotating the rotary plates. Accordingly, optical systems such as a galvanometer mirror or a polygonal mirror which have been used for the main scanning of the stimulable phosphor sheet and the recording medium in the conventional systems can be eliminated, whereby the scanning systems can be compactly arranged, and operation and adjustment of the scanning systems are facilitated. Further, the manufacturing cost of the scanning systems can be lowered by the cost of such optical systems.

Further, since the stimulating light beam and the recording light beam are caused to scan the stimulable phosphor sheet and the recording medium by operating the two rotary plates which are mounted on one rotational axis to be rotated integrally with each other, both the scanning systems for read-out and reproduction can be compactly arranged and manufactured at low cost. Further, since operation for synchronizing the rotary plates with each other is not required unlike the case where the rotary plates are independent from each other, operation and adjustment of the scanning systems are substantially facilitated.

Also in accordance with the third aspect of the present invention, the main scanning of the stimulable phosphor sheet and the recording medium is effected by rotating the rotary plate. Accordingly, optical systems such as a galvanometer mirror or a polygonal mirror which have been used for the raster scanning of the stimulable phosphor sheet and the recording medium in the conventional systems can be eliminated, whereby the scanning systems can be simplified and compactly arranged. This contributes to miniaturization of the system, and simplification of operation and adjustment of the system. Further, the manufacturing cost of the system can be lowered.

Further, since the stimulating light beam and the recording light beam is controlled to correctly focus respectively on the stimulable phosphor sheet and the recording medium on the basis of surface wobble of the rotary plate measured by the focus measuring system independent from the stimulating light beam projecting system and the recording light beam projecting system, the stimulating light beam and the recording light beam cannot be out of focus, whereby image information can be precisely read out and recorded.

Further, the scanning for read-out by the stimulating light beam and the scanning for recording by the recording light beam are effected by the use of one and the same rotary plate. That is, the read-out system and the recording system can have a single scanning system in common. This further contributes to miniaturization of the system, simplification of operation and adjustment of the system, and reduction of the manufacturing cost.

Further, in accordance with the first to third aspects of the present invention, by mounting a plurality of stimulable phosphor sheets on the rotary plate, read-out can be effected for a plurality of stimulable phosphor sheets at one time, thereby improving the rate of image information read-out.

Further, though the method of the present invention is particularly useful for image read-out and reproduction using small size stimulable phosphor sheets in which the rotary plates can be driven by a relatively small driving force, the present invention can also be applied to image read-out and reproduction using large size stimulable phosphor sheets.

DESCRIPTION OF THE PREFERRED EMBODIMENTS

Figure 1:
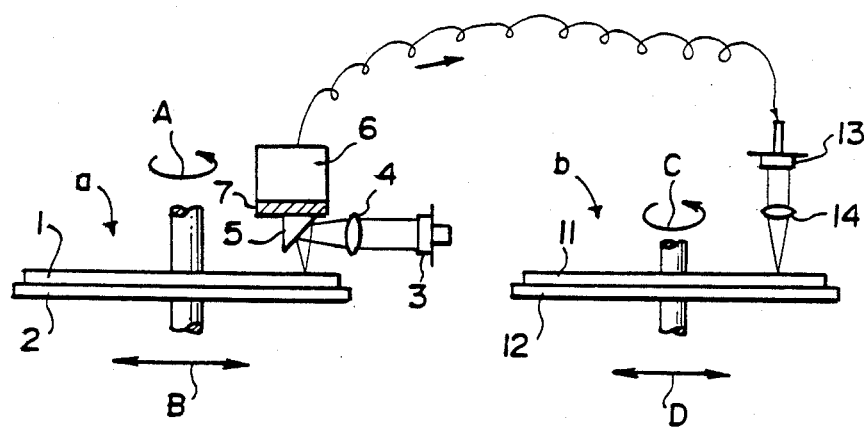
FIG. 1 is a schematic view showing an apparatus for carrying out a radiation image read-out and reproducing method in accordance with a first embodiment of the present invention.

FIG. 1 is a schematic view showing a radiation image read-out apparatus a and a radiation image recording apparatus b for carrying out a radiation image read-out and reproducing method in accordance with a first embodiment of the present invention. The radiation image read-out apparatus a comprises a first rotary disk 2 on which one or more stimulable phosphor sheets 1 are mounted and which is rotated in the direction of arrow A and linearly moved in the direction of arrow B in perpendicular to the rotational axis of the rotary disk 2; a light source 3, a condenser lens 4 and a half-silvered mirror 5 for projecting a laser beam onto the stimulable phosphor sheet 1 mounted on the first rotary disk 2 as the stimulating light beam; and a photoelectric converter 6 which receives light emitted by the stimulable phosphor sheet 1 upon stimulation by the laser beam and converts it to an electric image signal. Between the half-silvered mirror 5 and the photoelectric converter 6 is provided a cut filter 7 which transmits only a predetermined wavelength range so that only the light emitted by the stimulable phosphor sheet 1 can impinges upon the photoelectric converter 6. The stimulable phosphor sheet 1 stores a radiation image recorded thereon at a radiation image recording section (not shown). In the radiation image exposure section, a radiation is projected from a radiation source such as an X-ray tube toward an object, and the stimulable phosphor sheet 1 is exposed to the radiation passing through the object to have a radiation image of the object stored thereon. The stimulable phosphor sheet 1 carrying a radiation image stored thereon in such a manner is mounted on the first rotary disk 2 and the radiation image is read out by the radiation image read-out apparatus a.

The radiation image recording apparatus b comprises a second rotary disk 12 on which one or more recording media 11 are mounted and which is rotated in the direction of arrow C (the same direction as the direction of the arrow A) in synchronization with the first rotary disk 2 and linearly moved in the direction of arrow D in perpendicular to the rotational axis of the rotary disk 12; a light source 13 and a condenser lens 14 for projecting a laser beam modulated on the basis of an electric signal output from the photoelectric converter 6 onto the recording medium 11 mounted on the second rotary disk 12 as the recording light beam. When an internal modulation type semiconductor laser is employed as the light source 13 for recording, the laser beam is output-modulated by an oscillation output control electronic circuit which modulates the oscillation output power. On the other hand, when a gas laser (e.g., He-Ne laser) which is difficult of internal modulation is employed as the light source 13 for recording, the recording light beam is modulated by an external modulator such as an acoustooptic modulator (AOM), an electrooptic modulator (EOM) or the like which modulates a laser beam emitted from the laser. As the light source 13 for recording, an internal modulation type light emission diode may also be employed. The light source 3 for read-out need not be a laser but may be a light emission diode or the like. Though the recording medium 11 may be a latent image recording medium such as silver-salt photosensitive material, preferably, the recording medium 11 is one of those which permit reproduction of the radiation image as a visible image simultaneously with recording, e.g., a heat-sensitive recording medium.

The first and second rotary disks 2 and 12 should be rotated in the same phase, and it is preferred that the first and second rotary disks 2 and 12 are rotated so that the scanning speed is constant without depending upon the light beam projecting position.

When reading out the image on the stimulable phosphor sheet 1, the stimulable phosphor sheet 1 is mounted on the first rotary disk 2, and the position of the condenser lens 4 and the half-silvered mirror 5 is adjusted so that the laser beam (stimulating light beam) from the light source 3 correctly focuses on the stimulable phosphor sheet 1. Then the first rotary disk 2 is rotated at a constant linear velocity, and at the same time, is moved in the direction of the line passing the center of rotation of the first rotary disk 2 and the stimulating light beam projecting position (the direction of the arrow B) at a speed determined according to the distance of the stimulating light beam projecting position from the center of rotation of the first rotary disk 2. This causes the stimulating light beam to scan the stimulable phosphor sheet 1 along a spiral line at regular intervals, and by linearly moving the first rotary disk 2 so that the stimulating light beam impinges upon the stimulable phosphor sheet 1 from the outer peripheral side end to the inner peripheral side end, the entire area of the stimulable phosphor sheet surface can be scanned. Surface wobbling is apt to occur when the first rotary disk 2 is rotated and when surface wobbling occurs, the stimulating light beam cannot correctly focus on the stimulable phosphor sheet 1. Accordingly, it is preferred that the surface wobble of the first rotary disk 2 be measured by a separate optical system or the like, and the position of the condenser lens 4 be controlled to compensate for the surface wobble by a focus-servomechanism according to the measured surface wobble of the first rotary disk 2.

The part of the stimulable phosphor sheet 1 exposed to the stimulating light beam emits light in proportion to the stored radiation energy, and the light impinges upon the light receiving portion of the photoelectric converter 6 by way of the half-silvered mirror 5 and the cut filter 7. Accordingly, the lights emitted from respective portions of the stimulable phosphor sheet 1 exposed to the stimulating light beam successively enter the photoelectric converter 6 as the stimulable phosphor sheet 1 scanned by the stimulating light beam and are converted to electric image signals by the photoelectric converter 6. The electric image signals thus obtained are delivered to the radiation image recording apparatus b. As the photoelectric converter 6, a photomultiplier or the like can be used. Further, the photoelectric converter 6 may be provided with an amplifier and/or an A/D converter, if necessary.

The rotational speed of the first rotary disk 2 in the direction of the arrow A, that is, the rate of the main scanning by the stimulating light beam, is determined taking into account the desired pitches of the picture elements for reproduction of the radiation image as a visible image, the rate of reading of the photoelectric converter 6, and the like. It is preferred that the first rotary disk 2 be driven by a spindle motor and the rotation of the disk 2 be stabilized by the use of a spindle servo. Also the speed at which the first rotary disk 2 is moved in the direction of the arrow B, that is, the rate of the sub-scanning, is determined taking into account the desired pitches of the picture elements for reproduction.

Figure 2A:
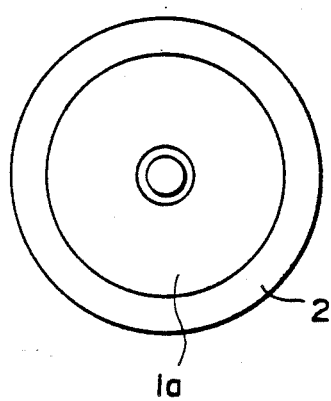
FIGS. 2A and 2B show examples of arrangement of the stimulable phosphor sheet on the rotary plate.
Figure 2B:
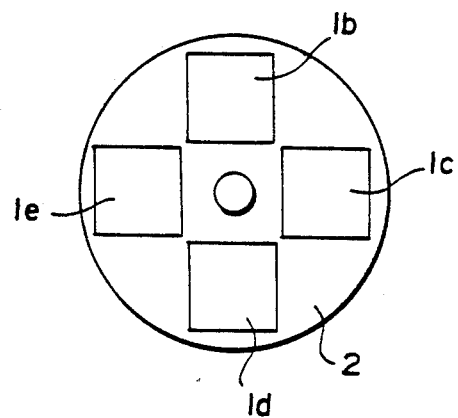

As described, one or more stimulable phosphor sheets 1 are mounted on the first rotary disk 2. When a single stimulable phosphor sheet is mounted on the first rotary disk 2, it is preferred that the stimulable phosphor sheet 1a be symmetrical about the center of rotation of the first rotary disk 2 as shown in FIG. 2A in order to stabilize rotation of the first rotary disk 2. When a plurality of stimulable phosphor sheets 1b to 1e are mounted on the first rotary disk 2 as shown in FIG. 2B, it is preferred that the stimulable phosphor sheets 1b to 1e be positioned so that the center of gravity of the stimulable phosphor sheets 1b to 1e coincides with the center of rotation of the first rotary disk 2 in order to stabilize rotation of the first rotary disk 2. When recesses or marks for locating the stimulable phosphor sheets are provided on the disk 2, positioning of the stimulable phosphor sheets is facilitated. Mounting and demounting of the stimulable phosphor sheet can be facilitated by providing the disk 2 and the stimulable phosphor sheet 2 with magnetic means which attract each other.

The image information read out by the radiation image read-out apparatus a is recorded by the radiation image recording apparatus b in the following manner. First, the recording medium 11 is mounted on the second rotary disk 12, and the position of the condenser lens 14 is adjusted so that the laser beam (recording light beam) from the light source 13 correctly focuses on the recording medium 11. Then the second rotary disk 12 is rotated in the direction of the arrow C in synchronization with the first rotary disk 12, and at the same time, is moved in the direction of the line passing the center of rotation of the second rotary disk 12 and the recording light beam projecting position (the direction of the arrow D) at a predetermined speed in synchronization with the movement of the first rotary disk 2 in the direction of the arrow B. This causes the recording light beam to scan the recording medium 11 along a spiral line similar to the scanning line of the stimulating light beam. Thus, in this embodiment, the recording light beam is caused to scan the recording medium 11 in the main scanning direction by rotation of the second rotary disk 12 and in the sub-scanning direction by linear movement of the second rotary disk 12 in perpendicular to the rotational axis of the disk 12 similarly to the stimulating light beam. Accordingly, optical systems such as a galvanometer mirror or a polygonal mirror which have been used for the raster scanning of the recording medium in the conventional systems can be eliminated, whereby the system can be compactly arranged, can be simplified and can be manufactured at low cost. Since the main scanning and the sub-scanning for image read-out are carried in synchronization with those for image recording, the image reproduced on the recording medium 11 becomes similar to the latent image stored on the stimulable phosphor sheet 1. By selecting the recording radius, the ratio of the size of the reproduced image to that of the latent image can be changed. It is preferred that the rate of the main scanning and that of the sub-scanning be determined according to the ratio. Otherwise, the magnification (or the scale) in the peripheral direction of the reproduced image will differ from the magnification (or the scale) in the radial direction. In order to ensure that the recording light beam correctly focuses on the recording medium 11 irrespective of surface wobbling of the second rotary disk 12, it is preferred that the surface wobble of the second rotary disk 12 be measured by a separate optical system or the like, and the position of the condenser lens 14 be controlled to compensate for the surface wobble by a focus-servomechanism according to the measured surface wobble of the second rotary disk 12. Further it is preferred that the second rotary disk 12 be driven by a spindle motor and the rotation of the disk 12 be stabilized by the use of a spindle servo as in the case of the first rotary disk 2.

The size of the recording medium 11 may be determined according to the desired size of the visible image to be obtained. Similarly to the stimulable phosphor sheet 1, it is preferred that the shape of the recording medium 11 be suitable for stabilizing rotation of the second rotary disk 12.

The recording medium 11 should be mounted on the disk 12 not to move relative to the disk 12 during recording. Mounting and demounting of the recording medium 11 can be facilitated by mounting it under an electrostatic attraction force or a magnetic attraction force.

Though, in the embodiment described above, the first and second rotary disks 2 and 12 are rotated in the same direction for the main scanning, the disks 2 and 12 may be rotated in opposite directions- In this case, the radiation image stored on the stimulable phosphor sheet 1 is reproduced on the recording medium 11 as a visible image reversed from right to left.

Further, though, in the embodiment described above, the sub-scanning of each of the stimulable phosphor sheet 1 and the recording medium 11 by the light beam is carried out by moving the rotary disk in the direction of the arrow B or D, the optical system for projecting the light beam (e.g., the light source 3, the condenser lens 14 and the half-silvered mirror 5; or the light source 13 and the condenser lens 14) may be moved in the direction of the arrow B or D with the disk fixed instead, or both the rotary disk and the optical system may be moved in the direction of the arrow B or D.

Figure 3:
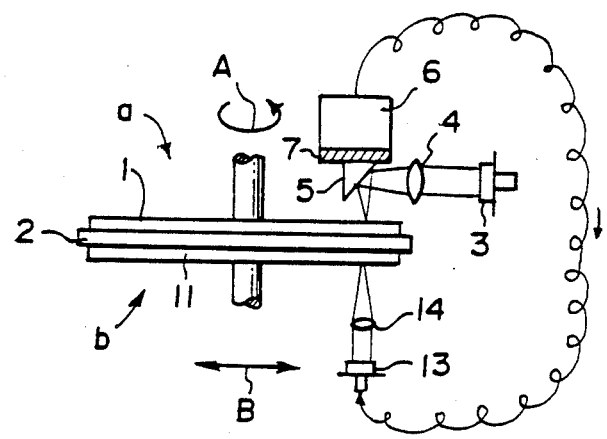
FIG. 3 is a schematic view showing an apparatus for carrying out a radiation image read-out and reproducing method in accordance with a second embodiment of the present invention.

FIG. 3 is a schematic view showing a radiation image read-out and reproducing apparatus for carrying out a radiation image read-out and reproducing method in accordance with a second embodiment of the present invention. In FIG. 3, the parts analogous to the parts shown in FIG. 1 are given the same reference numerals and will not be described here. This apparatus comprises a radiation image read-out section a shown in the upper half of FIG. 3 and a radiation image recording section b shown in the lower half of FIG. 3. The read-out section a and the recording section b have a single rotary disk 2 in common. Though it is natural that the upper and lower surfaces of the rotary disk 2 are moved integrally with each, the upper and lower surfaces are regarded as being first and second rotary disks and as belonging to the read-out section a and the recording section b, hereinbelow, for the purpose of simplicity.

The read-out light source 3 and the recording light source 13 are both fixed and the stimulating light beam projecting position and the recording light beam projecting position are arranged to be opposed to each other with the disk 2 intervening therebetween.

The stimulable phosphor sheet 1 may be mounted and arranged on the disk 2 in the manner described above in conjunction with FIGS. 2A and 2B.

Since the operation of the radiation image read-out section a is substantially the same as that of the image read-out apparatus employed in the apparatus shown in FIG. 1, description will be made only on the radiation image recording section b, hereinbelow. The recording medium 11 is mounted on the lower surface of the rotary disk 2, and the position of the condenser lens 14 is adjusted so that the recording light beam (a laser beam emitted from the light source 13 and modulated on the basis of the electric image signal input from the photoelectric converter 6 of the read-out section) focuses on the recording medium 11 in the position opposed to the stimulating light beam projecting position on the stimulable phosphor sheet 1. When the rotary disk 2 is rotated and linearly moved to effect the main scanning and the sub-scanning of the stimulable phosphor sheet 1 by the stimulating light beam in this state, the main scanning and the sub-scanning of the recording medium 11 by the recording light beam occur in the recording section b. That is, rotation of the rotary disk 2 in the direction of the arrow A causes the recording light beam to scan the recording medium in the main scanning direction, and radial movement of the same in the direction of the arrow B at a predetermined speed causes the recording light beam to scan the recording medium 11 in the sub-scanning direction. Since the recording light beam projecting position is always opposed to the stimulating light beam projecting position with the disk 2 intervening therebetween, the recording light beam scans the recording medium 11 along the same spiral line as the line along which the stimulating light beam scans the stimulable phosphor sheet 1. However, in this case, the radiation image stored on the stimulable phosphor sheet 1 is reproduced on the recording medium 11 as a visible image reversed from right to left.

Further, though, in the embodiment described above, the sub-scanning of each of the stimulable phosphor sheet 1 and the recording medium 11 by the light beam is carried out by moving the rotary disk 2 in the direction of the arrow B, the optical system for projecting the light beam (e.g., the light source 3, the condenser lens 14 and the half-silvered mirror 5; or the light source 13 and the condenser lens 14) may be moved in the direction of the arrow B with the disk 2 fixed instead, or both the rotary disk and the optical system may be moved in the direction of the arrow B. When the optical systems are to be moved, it is preferred that the optical systems be fixed to the same base or the like so that the optical systems can be moved integrally with each other.

Further, though, in the embodiment described above, the first and second rotary disks are in contact with each other, they may be spaced from each other so long as they have a rotational shaft in common.

Figure 4:
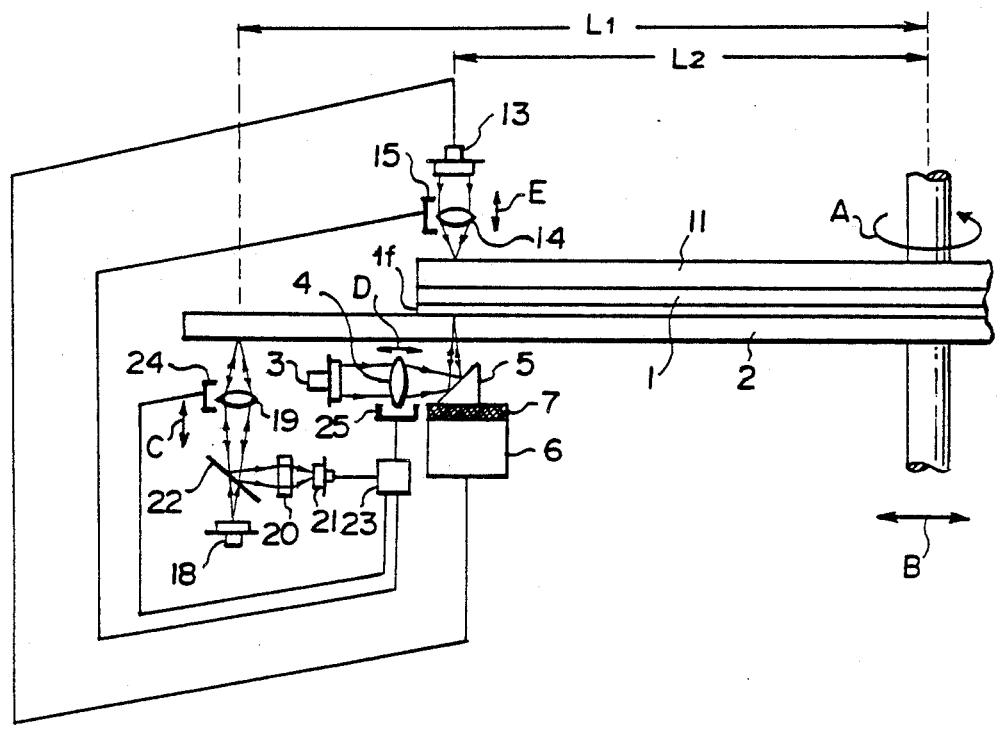
FIG. 4 is a schematic view showing an apparatus for carrying out a radiation image read-out and reproducing method in accordance with a third embodiment of the present invention.

FIG. 4 is a schematic view showing a radiation image read-out and reproducing apparatus for carrying out a radiation image read-out and reproducing method in accordance with a third embodiment of the present invention. In FIG. 4, the parts analogous to the parts shown in FIG. 1 are given the same reference numerals and will not be described here.

The radiation image read-out and reproducing apparatus comprises a transparent rotary disk 2 on which a stimulable phosphor sheet 1 is mounted and which is rotated in the direction of arrow A at a predetermined constant linear velocity and linearly moved in the direction of arrow B in perpendicular to the rotational axis of the rotary disk 2; a light source 3, a condenser lens 4 and a half-silvered mirror 5 for projecting a laser beam onto the stimulable phosphor sheet 1 (mounted on the rotary disk 2 with the recording surface lf thereof facing downward) through the disk 2 from below the disk 2 as the stimulating light beam; and a photoelectric converter 6 which receives light emitted by the stimulable phosphor sheet 1 upon stimulation by the laser beam and converts it to an electric signal. The apparatus further comprises a measuring light source 18 and a condenser lens 19 for projecting a wobble measuring light beam (laser beam) onto the lower surface of the rotary disk 2 in a position on the line passing the stimulating light beam projecting position and the center of rotation of the disk 2; a cylindrical lens 20 and a quadrant photodiode 21 for measuring the amount of "out-of-focus" by which the wobble measuring light beam is out of focus by detecting the wobble measuring light reflected from the rotary disk 2; a half-silvered mirror 22 for causing the wobble measuring light reflected from the rotary disk 2 to impinge upon the quadrant photodiode 21; a calculating means 23 which determines the surface wobble of the rotary disk 2 on the basis of the measured amount of out-of-focus; a condenser lens drive means 24 which moves back and forth the condenser lens 19 in the direction of the arrow C so that the wobble measuring light beam correctly focuses on the rotary disk 2 on the basis of the surface wobble of the rotary disk 2 determined by the calculating means 23; a read-out condenser lens drive means 25 which moves back and forth the condenser lens 4 in the direction of the arrow D so that the stimulating light beam from the light source 3 correctly focuses on the stimulable phosphor sheet 1 on the basis of the surface wobble of the rotary disk 2 determined by the calculating means 23; a recording light source 13 and a condenser lens 14 for projecting, as the recording light beam, a laser beam modulated on the basis of the electric image signal output from the photoelectric converter 6 onto the recording medium 11 mounted on the rotary disk 2; and a recording condenser lens drive means 15 which moves back and forth the condenser lens 14 in the direction of the arrow E so that the recording light beam from the light source 13 correctly focuses on the recording medium 11 on the basis of the surface wobble of the rotary disk 2 determined by the calculating means 23.

The read-out light source 3 and the recording light source 13 are both fixed and the stimulating light beam projecting position and the recording light beam projecting position are arranged to be opposed to each other with the disk 2 intervening therebetween.

Since read-out of the radiation image stored on the stimulable phosphor sheet 1 and reproduction of the radiation image as a visible image on the recording medium 11 are carried out in the manner substantially the same as that described above in conjunction with the second embodiment of the present invention, only the system for compensating for the surface wobble of the rotary disk will be described hereinbelow. This system is substantially the same as that employed for an optical disk but differs from the same in that it has an optical system separate from the optical system for reading the signal. That is, the position of the condenser lens 19 is adjusted so that the laser beam emitted from the light source 18 and traveling straight through the half-silvered mirror 22 focuses on the lower surface of the rotary disk 2 with the rotary disk 2 positioned in a standard position. The laser beam reflected at the lower surface of the rotary disk 2 is further reflected by the half-silvered mirror 22 to impinge upon the quadrant photodiode 21 through the cylindrical lens 20. The position of the cylindrical lens 20 and the quadrant photodiode 21 is adjusted so that the beam image formed on the photodiode is circular when the rotary disk 2 is in the standard position. Further, the photodiode 21 is adjusted so that its signal output is zero in this state. When the rotary disk 2 is rotated, the rotary disk 2 periodically vibrated up and down, that is, so-called surface wobbling occurs. If the focusing point of the stimulating light beam or the recording light beam is fixed in this state, the light beam is periodically out of focus, thereby adversely affecting read-out or recording of the radiation image. When the rotary disk 2 wobbles, the beam image formed on the quadrant photodiode 21 distorted into an ellipse depending on the wobble due to astigmatism of the cylindrical lens 20 and an electric signal according to the shape of the beam image is output from the photodiode 21. Since the photodiode 21 outputs no electric signal when the rotary disk 2 is in the standard position as described above, the calculating means outputs a correction signal on the basis of the output signal of the photodiode when any signal is output therefrom to move the condenser lens 19 in the direction of arrow C so that the laser beam correctly focuses on the lower surface of the rotary disk 2. When the correction signal is output, the condenser lens drive means 24 moves the condenser lens 19 in the direction of the arrow C on the basis of the correction signal. At the same time, the calculating means 23 outputs second and third correction signals on the basis of the output signal of the photodiode 21 and the read-out condenser lens drive means 25 and the recording condenser lens drive means 15 respectively move the read-out condenser lens 4 and the recording condenser lens 14 in the direction of arrow D and in the direction of arrow E on the basis of the second and third correction signals so that the stimulating light beam and the recording light beam correctly focus respectively on the recording surface 1f of the stimulable phosphor sheet 1 and the upper surface of the recording medium 11. The calculating means 23 calculates the correction signals in the following manner.

When the wobble of the rotary disk 2 (upward and downward displacement from the standard position) in the measuring light beam projecting position (the position in which the measuring light beam impinges upon the lower surface of the rotary disk 2) is represented by $\gamma_1$, the radial distance between the center of rotation of the rotary disk 2 and the measuring light beam projecting position is represented by L1, and the radial distance between the center of rotation of the rotary disk 2 and the stimulating light beam projecting position is represented by L2, the calculating means 23 calculates the upward and downward displacement of the stimulating light beam projecting position $\gamma_2$ on the basis of formula $$\gamma_2 = \gamma_1 \times L2/L1 \ .$$

and outputs an electrical signal representing the value of the displacement of the stimulating light beam projecting position as the second correction signal. The upward and downward displacement $\gamma_3$ of the recording light beam projecting position due to wobbling of the rotary disk 2 is equal to $-\gamma_2$. Accordingly, the calculating means 23 calculates the upward and downward displacement of the recording light beam projecting position $\gamma_3$ on the basis of formula $$\gamma_3 = -\gamma_1 \times L2/L1$$

and outputs an electrical signal representing the value of the displacement of the recording light beam projecting position as the third correction signal. The above formulae hold when the measuring light projecting position is on the line passing through the stimulating light beam projecting position and the center of rotation of the rotary disk 2. The measuring light beam must be arranged so that it constantly impinges upon the rotary disk 2 even if the rotary disk 2 is moved along the direction of the arrow B. Further, in order to obtain a high accuracy in the focus adjustment, it is preferred that the measuring light beam projecting position be set as near as possible to the stimulating light beam projecting position.

Since the focus adjustment is performed over the entire scanning period of the stimulable phosphor sheet 1 in this embodiment, the stimulating light beam and the recording light beam can be prevented from being out of focus even if the rotary disk 2 wobbles, whereby image read-out and image recording can be accomplished with accuracy.

The optical system and the electrical system for projecting the measuring light beam and for detecting the reflected measuring light beam and outputting the correction signals need not be limited to those described above, but various other auto-focusing systems may be employed.

Though the measuring light beam may be projected onto the upper surface of the rotary disk 2, it should be noted that plus and minus of the correction amounts input into the respective condenser lens drive means are reversed.

Figure 5:
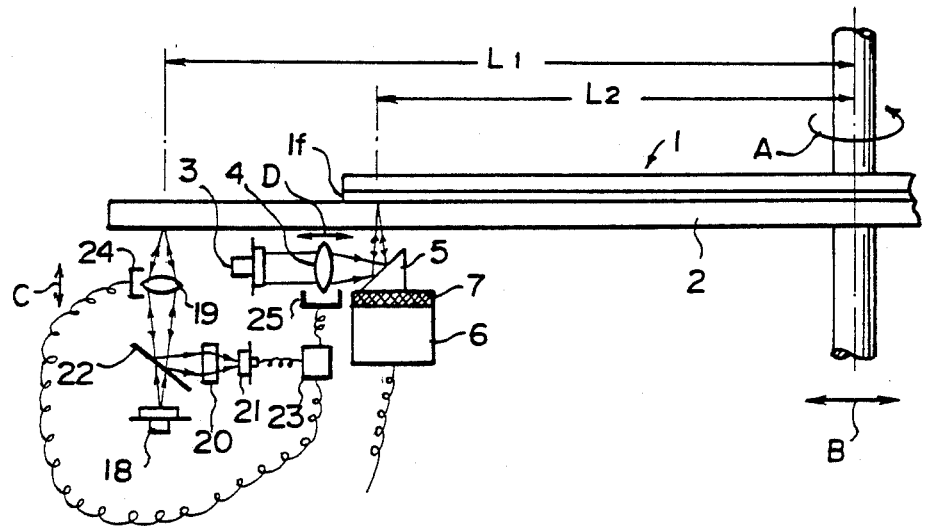
FIG. 5 is a schematic view showing an apparatus for carrying out a radiation image read-out and reproducing method in accordance with a fourth embodiment of the present invention.

FIG. 5 is a schematic view showing a radiation image read-out apparatus for carrying out a radiation image read-out method in accordance with a fourth embodiment of the present invention. Since this radiation image read-out apparatus is equivalent to an apparatus obtained by removing the parts for reproducing the radiation image as a visible image from the apparatus shown in FIG. 4. Accordingly, the part analogous to the parts shown in FIG. 4 are given the same reference numerals and the apparatus shown in FIG. 5 will not be described in detail here.

Though, in FIG. 5, the stimulable phosphor sheet 1 is mounted on the upper surface of the rotary disk 2 with the recording surface 1f facing upward, and both the stimulating light beam and the measuring light beam are projected upward from below the rotary disk 2, these manners need not be limited to those shown in FIG. 5. For example, the stimulable phosphor sheet 1 may be mounted on the upper surface of the rotary disk 2 with the recording surface facing upward and the stimulating light beam and the measuring light beam may be projected downward from above the rotary disk 2. When such a modification is made, the plus or minus of the correction signals respectively input into the condenser lens drive means 24 and the read-out condenser lens drive means 25 should be conformed to the modification.

As the optical system for projecting the light beam and the photoelectric converter means need not be limited to those described above. For example, the half-silvered mirror of the optical system for projecting the stimulating light beam may be eliminated by setting the stimulating light beam incident angle on the stimulable phosphor sheet 1 to a predetermined value (except zero) so that the stimulating light beam incident direction is deviated from the direction in which the light emitted from the stimulable phosphor sheet 1 upon stimulation is maximized.

Further, the methods described above can also be applied to a case where the stimulable phosphor sheet 1 and the recording medium 11 are scanned along concentric circles.

I claim:

1. A radiation image read-out and reproducing method characterized by steps of mounting at least one stimulable phosphor sheet carrying a radiation image stored thereon and at least one recording medium for reproducing a radiation image as a visible image respectively on first and second rotary plates, projecting a stimulating light beam onto the stimulable phosphor sheet while the first rotary plate is rotated, thereby effecting main scanning of the sheet by the stimulating light beam and the stimulating light beam is moved relative to the first rotary plate in a radial direction of the first rotary plate, thereby effecting sub-scanning of the sheet by the stimulating light beam, photoelectrically detecting light emitted by the stimulable phosphor sheet upon stimulation by the stimulating light beam by a photoelectric converter means, thereby obtaining an electric image signal representing the radiation image stored on the stimulable phosphor sheet, projecting a recording light beam modulated on the basis of the electric image signal onto the recording medium while the second rotary plate is rotated in synchronization with the main scanning of the recording medium by the stimulating light beam, thereby effecting main scanning of the recording medium by the recording light beam, moving the recording light beam relative to the second rotary plate in a radial direction of the second rotary in synchronization with the sub-scanning of the stimulable phosphor sheet by the stimulating light beam, thereby effecting sub-scanning of the recording medium by the recording light beam, and thus recording the radiation image on the recording medium simultaneously with read-out of the radiation image stored on the stimulable phosphor sheet.

2. A radiation image read-out and reproducing method as defined in claim 1 characterized in that the direction in which the first rotary plate is rotated with respect to the stimulating light beam is the same as the direction in which the second rotary plate is rotated with respect to the recording light beam.

3. A radiation image read-out and reproducing method as defined in claim 1 characterized in that the direction in which the first rotary plate is rotated with respect to the stimulating light beam is opposite to the direction in which the second rotary plate is rotated with respect to the recording light beam.

4. A radiation image read-out and reproducing method as defined in claim 1 in which said stimulable phosphor sheet is mounted on the first rotary plate so that the center of gravity of the sheet coincides with the center of rotation of the first rotary plate.

5. A radiation image read-out and reproducing method as defined in claim 4 in which a plurality of stimulable phosphor sheets are mounted on the first rotary plate to surround the center of rotation of the first rotary plate.

6. A radiation image read-out and reproducing method as defined in claim 1 in which said recording medium is mounted on the second rotary plate so that the center of gravity of the recording medium coincides with the center of rotation of the second rotary plate.

7. A radiation image read-out and reproducing method as defined in claim 6 in which a plurality of recording media are mounted on the second rotary plate to surround the center of rotation of the second rotary plate.

8. A radiation image read-out and reproducing method as defined in claim 1 in which said main scanning of the stimulable phosphor sheet is effected at a constant linear velocity.

9. A radiation image read-out and reproducing method as defined in claim 1 in which the rotation of the first rotary plate for the main scanning of the stimulable phosphor sheet is the same in phase as that of the second rotary plate for the main scanning of the recording medium.

10. A radiation image read-out and reproducing method as defined in claim 1 in which said sub-scanning of the stimulable phosphor sheet is effected by moving the stimulating light beam in a radial direction of the first rotary plate with the first rotary plate being fixed.

11. A radiation image read-out and reproducing method as defined in claim 1 in which said sub-scanning of the stimulable phosphor sheet is effected by moving the first rotary plate in a radial direction thereof with the stimulating light beam being fixed.

12. A radiation image read-out and reproducing method as defined in claim 1 in which said sub-scanning of the recording medium is effected by moving the recording light beam in a radial direction of the second rotary plate with the second rotary plate being fixed.

13. A radiation image read-out and reproducing method as defined in claim 1 in which said sub-scanning of the recording medium is effected by moving the second rotary plate in a radial direction thereof with the recording light beam being fixed.

14. A radiation image read-out and reproducing method characterized by steps of mounting at least one stimulable phosphor sheet carrying a radiation image stored thereon and at least one recording medium for reproducing a radiation image as a visible image respectively on first and second rotary plates which are mounted on the same rotational shaft to be rotated integrally with each other, projecting a stimulating light beam and a recording light beam respectively onto the stimulable phosphor sheet and the recording medium while the first and second rotary plates are rotated integrally with each other, thereby effecting main scanning of the sheet and the recording medium by the respective light beams, the distance and the direction by which and in which the recording light beam projecting position is spaced from the center of rotation of the second rotary plate being equal to those by which and in which the stimulating light beam projecting position is spaced from the center of rotation of the first rotary plate, and the stimulating light beam and the recording light beam are moved relative to the first and second rotary plates in a radial direction of the respective rotary plates, thereby effecting sub-scanning of the sheet and the recording medium by the respective light beams, photoelectrically detecting light emitted by the stimulable phosphor sheet upon stimulation by the stimulating light beam by a photoelectric converter means, thereby obtaining an electric image signal representing the radiation image stored on the stimulable phosphor sheet, modulating said recording light on the basis of the electric image signal, and thus recording the radiation image on the recording medium simultaneously with read-out of the radiation image on the stimulable phosphor sheet.

15. A radiation image read-out and reproducing method as defined in claim 14 in which said first and second rotary plates are united into a single rotary plate and said stimulable phosphor sheet is mounted on one side of the single rotary plate while the recording medium is mounted on the other side of the same.

16. A radiation image read-out and reproducing method as defined in claim 15 in which the stimulating light projecting position and the recording light beam projecting position are opposed to each other with the single rotary plate intervening therebetween.

17. A radiation image read-out and reproducing method as defined in claim 14 in which said stimulable phosphor sheet is mounted on the first rotary plate so that the center of gravity of the sheet coincides with the center of rotation of the first rotary plate.

18. A radiation image read-out and reproducing method as defined in claim 17 in which a plurality of stimulable phosphor sheets are mounted on the first rotary plate to surround the center of rotation of the first rotary plate.

19. A radiation image read-out and reproducing method as defined in claim 14 in which said recording medium is mounted on the second rotary plate so that the center of gravity of the recording medium coincides with the center of rotation of the second rotary plate.

20. A radiation image read-out and reproducing method as defined in claim 19 in which a plurality of recording media are mounted on the second rotary plate to surround the center of rotation of the second rotary plate.

21. A radiation image read-out and reproducing method as defined in claim 14 in which said main scanning of the stimulable phosphor sheet is effected at a constant linear velocity.

22. A radiation image read-out and reproducing method as defined in claim 14 in which said sub-scanning of the stimulable phosphor sheet and the recording medium is effected by moving the stimulating light beam and the recording light beam in a radial direction of the corresponding rotary plates with the respective rotary plates being fixed.

23. A radiation image read-out and reproducing method as defined in claim 14 in which said sub-scanning of the stimulable phosphor sheet and the recording medium is effected by moving the corresponding rotary plates in a radial direction thereof with the respective light beams being fixed.

24. A radiation image read-out and reproducing method characterized by steps of mounting at least one stimulable phosphor sheet carrying a radiation image stored thereon and at least one recording medium adapted to recording the radiation image as a visible image on a rotary plate rotatable about a rotational axis so that the recording surfaces the stimulable phosphor sheet and the recording medium face in opposite directions, projecting a stimulating light beam onto the stimulable phosphor sheet while a recording light beam is projected onto the recording medium to impinge upon the recording medium in a position which is equal in direction and distance from the rotational axis of the rotary plate to the stimulating light beam projecting position on the stimulable phosphor sheet in which the stimulating light beam impinges upon the stimulable phosphor sheet, main scanning of the stimulable phosphor sheet by the stimulating light beam and main scanning of the recording medium by the recording light beam being effected by rotating the rotary plate during projection of the stimulating light beam and the recording light beam, sub-scanning of the stimulable phosphor sheet by the stimulating light beam and sub-scanning of the recording medium by the recording light beam being effected by moving the stimulating light beam and the recording light beam relative to the rotary plate in a radial direction of the rotary plate, measuring the surface wobble of the rotary plate due to the rotation thereof, controlling the stimulating light beam and the recording light beam to correctly focus respectively on the stimulable phosphor sheet and the recording medium on the basis of the result of the measurement while the stimulable phosphor sheet and the recording medium are scanned by the respective light beams, photoelectrically detecting light emitted by the stimulable phosphor sheet upon stimulation by the stimulating light beam by a photoelectric converter means, thereby obtaining an electric image signal representing the radiation image stored on the stimulable phosphor sheet, modulating said recording light on the basis of the electric image signal, and thus recording the radiation image on the recording medium simultaneously with read-out of the radiation image stored on the stimulable phosphor sheet.

25. A radiation image read-out and reproducing method as defined in claim 24 in which said surface wobble of the rotary plate is measured by projecting a measuring light onto the rotary plate and detecting reflected light from the rotary plate.

26. A radiation image read-out and reproducing method as defined in claim 25 in which said reflected light is detected by a quadra-photodiode.

27. A radiation image read-out and reproducing method as defined in claim 24 in which said stimulable phosphor sheet and the recording medium are mounted on the rotary plate so that the respective centers of gravity of thereof coincides with the center of rotation of the rotary plate.

28. A radiation image read-out and reproducing method as defined in claim 27 in which a plurality of stimulable phosphor sheets and a plurality of recording media are mounted on the first rotary plate to surround the center of rotation of the first rotary plate.

29. A radiation image read-out and reproducing method as defined in claim 24 in which said main scanning of the stimulable phosphor sheet is effected at a constant linear velocity.

30. A radiation image read-out and reproducing method as defined in claim 24 in which said sub-scanning of the stimulable phosphor sheet and the recording medium is effected by moving the stimulating light beam and the recording light beam in a radial direction of the corresponding rotary plates with the respective rotary plates being fixed.

31. A radiation image read-out and reproducing method as defined in claim 24 in which said sub-scanning of the stimulable phosphor sheet and the recording medium is effected by moving the corresponding rotary plates in a radial direction thereof with the respective light beams being fixed 32. A radiation image read-out method characterized by steps of mounting a stimulable phosphor sheet carrying a radiation image stored thereon on a rotar plate, projecting a stimulating light beam onto the stimulable phosphor sheet while the rotary plate is rotated, thereby effecting main scanning of the sheet by the stimulating light beam and the stimulating light beam is moved relative to the rotary plate in a radial direction of the first rotary plate, thereby effecting sub-scanning of the sheet by the stimulating light beam, measuring the surface wobble of the rotary plate due to the rotation thereof, controlling the stimulating light beam to correctly focus on the stimulable phosphor sheet on the basis of the result of the measurement while the stimulable phosphor sheet is scanned by the stimulating light beam, and photoelectrically detecting light emitted by the stimulable phosphor sheet upon stimulation by the stimulating light beam by a photoelectric converter means, thereby obtaining radiation image information.

* * * * *